United States Patent [19]

Chung

[11] 4,319,400
[45] Mar. 16, 1982

[54] CENTERING DEVICE

[76] Inventor: Hun-Hwei Chung, 2-16, Lane 81, Chung Shen Rd., Fon Yuan City, Taiwan

[21] Appl. No.: 110,609

[22] Filed: Jan. 9, 1980

[51] Int. Cl.³ ............................................. G01B 5/25
[52] U.S. Cl. .............................. 33/169 C; 33/172 D; 33/DIG. 1
[58] Field of Search ............ 33/172 D, 169 C, 169 R, 33/172 R, DIG. 1

[56] References Cited

U.S. PATENT DOCUMENTS

| | | | |
|---|---|---|---|
| 1,414,483 | 5/1922 | Novitzky | 33/172 |
| 2,286,088 | 6/1942 | Harrell | 33/169 C |
| 2,484,801 | 10/1949 | Anderson | 33/169 C |
| 2,506,236 | 5/1950 | Overwyer, Jr. | 33/172 R |
| 2,572,999 | 10/1951 | Elliott | 33/178 D |
| 2,674,807 | 4/1954 | Russa | 33/169 C |
| 2,734,277 | 2/1956 | Dixon et al. | 33/172 D |
| 3,075,294 | 1/1963 | Strecker | 33/169 R |
| 3,120,062 | 2/1964 | Butala | 33/169 R |
| 3,785,057 | 1/1974 | Streander | 33/169 R |
| 3,826,011 | 7/1974 | D'Aniello | 33/174 Q |

FOREIGN PATENT DOCUMENTS 557267 11/1943 United Kingdom ............ 33/169 R

*Primary Examiner*—Willis Little
*Attorney, Agent, or Firm*—Tak Ki Sung

[57] ABSTRACT

A centering device comprising a centering pointer and a centering block to be used in conjunction with a conventional dial indicator for locating the center of a workpiece and aligning the center of the workpiece with the center axis of the spindle of a manufacturing machine without the need of marking the workpiece prior to the set up of the workpiece for the cutting process. The centering pointer comprises a needle resiliently and slidably held in a hollow holder for mounting onto the spindle of a manufacturing machine such as a drill press and the like, the needle having a lever rigidly connected thereto for transmitting the movement to the lower point of the dial indicator. The centering block is formed of a cylindrical block with a L shaped cutaway at an angle of 90 degrees along the axis with one surface thereof passing through the center axis of the cylindrical block for mounting onto an edge of the workpiece for aligning the edge of the workpiece with the center axis of the spindle of the manufacturing machine.

2 Claims, 8 Drawing Figures

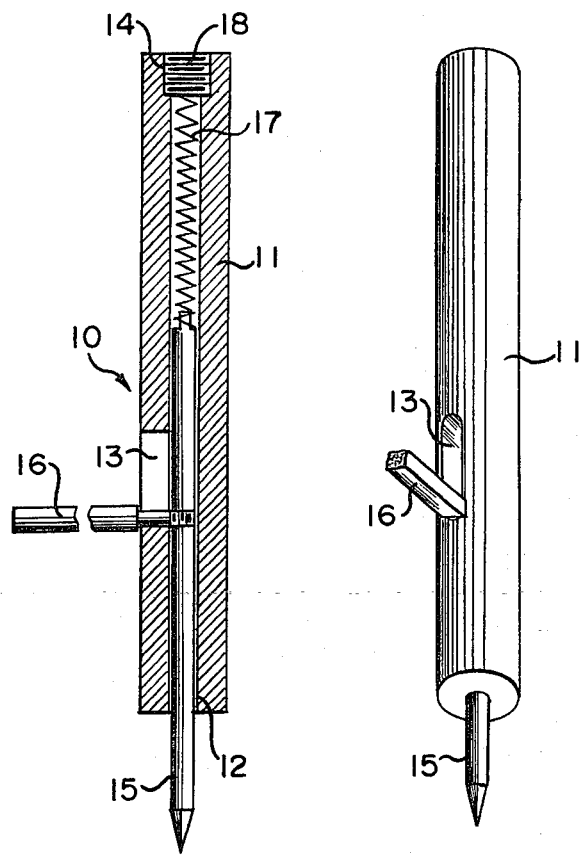
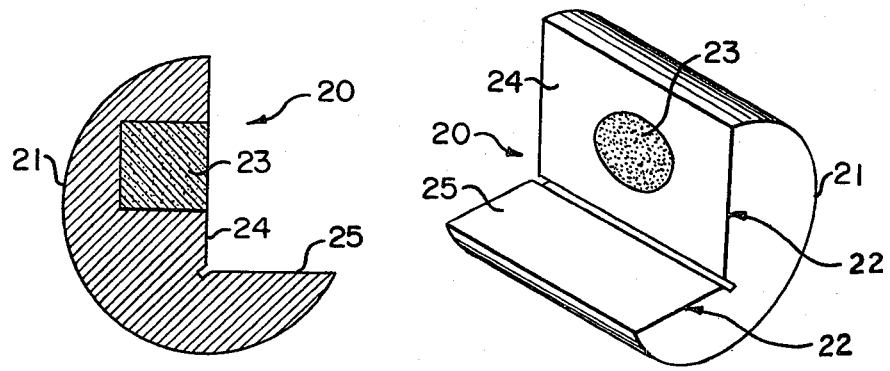
FIG. 2    FIG. 1
FIG. 3    FIG. 4

CENTERING DEVICE

BACKGROUND OF THE INVENTION

1. Field of the Invention

This invention relates to a centering device for locating the center of a workpiece and for aligning the center of a workpiece with the center axis of the spindle of a manufacturing machine such as a drill press and the like.

2. Description of Prior Art

As of this date the inventor is not aware of any prior art that can be considered obvious or similar to the present invention.

A commonly accepted practice in most machine shops for locating the center of a workpiece is marking the workpiece with reference lines as shown in the blue print, on a surface plate by means of a number of marking instruments including a surface gage, a height gage, a scriber etc. As soon as the work piece is marked with reference lines, the center point is further marked with a center punch, and then the work piece is mounted onto the worktable with suitable clamping means such as vise for drilling or cutting.

For mass production jigs and fixtures are a known means for aligning a work piece in a predetermined position with the center axis of the spindle of the manufacturing machine, but because of the high cost of jigs and fixtures, in the case of small quantity jobs the alignment of the center axis is usually done by visual inspection with or without an optical instrument.

Such common practices for locating and aligning a center position with the center axis of the spindle of a manufacturing machine have such shortcomings as requiring skill in the marking process, extra handling of the work piece in the marking process, inaccuracy of visual inspection in the alignment process, and high cost for optical instruments.

SUMMARY OF THE INVENTION

In view of aforesaid conventional shortcomings the present invention offers a novel centering device of simple construction, low cost and practical accuracy for use in general machine shops.

The centering device of this invention comprises a centering pointer having a needle resiliently and slidably held in a hollow holder for mounting onto the spindle of a manufacturing machine, the needle having a lever rigidly connected thereto and extending outwardly through an elongated slot provided in the holder for transmitting the movement of the needle to the lower point of a conventional dial indicator which is to be used in association with this invention, and a centering block formed of a cylindrical piece with a L shaped cutaway at 90° angle along the axis, the L shaped cutaway having at least one surface thereof passing through the center axis of the cylindrical block for mounting onto an edge of the workpiece. The centering pointer is to be mounted onto the spindle of a manufacturing machine with the center axis of the centering pointer coinciding with the center axis of the spindle in order that the center position of the work piece be aligned with the center axis of the spindle when the center axis of the centering pointer is aligned with the center position of the work piece. The centering block is to be mounted onto an edge of the workpiece with the surface of the L shaped cutaway passing through the center axis of the centering block in abutment with the side surface of the workpiece, in order that the side surface is aligned with the center axis of the spindle when the vertical center axis of the centering block is aligned with the center axis of the centering pointer mounted onto the spindle.

Therefore, the main object of this invention is to provide a simple, low cost centering device for locating and aligning the center position of a workpiece with the center axis of the spindle of a manufacturing machine without the need of marking the workpiece with lines.

DETAILED DESCRIPTION OF THE INVENTION

The features, objects and advantages of the invention will be apparent from the following description taken in conjunction with the accompanying drawings, in which:

FIG. 1 is a perspective view of an embodiment of the centering pointer according to the invention.

FIG. 2 is a longitudinal, sectional view of the centering pointer as shown in FIG. 1.

FIG. 3 is a cross sectional view of an embodiment of the centering block according to this invention.

FIG. 4 is a perspective view of the centering block as shown in FIG. 3.

Figures 5A, 5B:
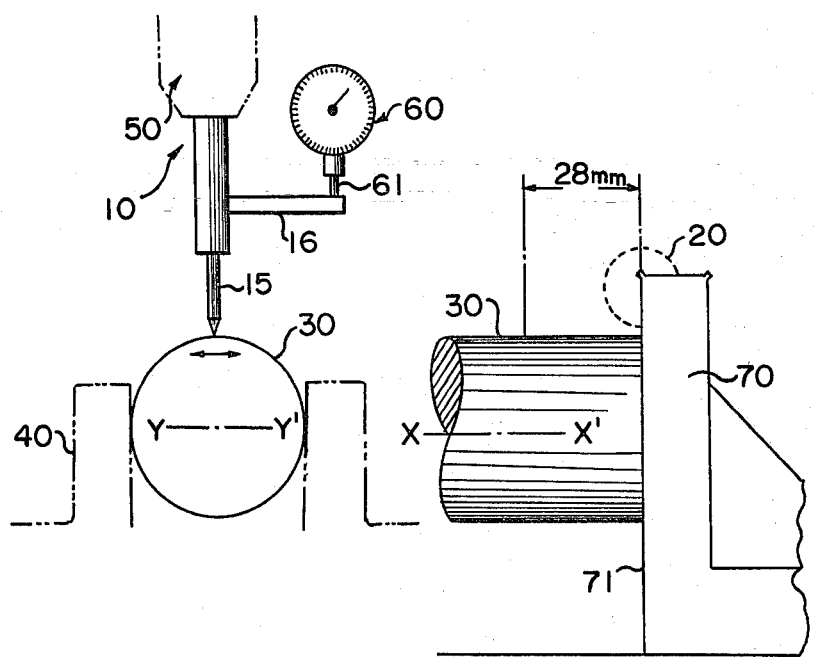
FIGS. 5A and 5B are drawings illustrating an example of the application of the centering device of this invention.

Referring to FIGS. 1 and 2, the centering pointer 10 comprises a slender, hollow holder 11 provided with a through hole 12, a needle 15 formed with a finely polished lower point, a coil spring 17 and a plug 18, said needle 15 being slidably inserted into the hole 12 of the holder 11 and provided with a lever 16 firmly mounted thereon by means of a screw thread engagement, the lever 16 extending through an elongated slot 13 provided on the holder along its axis and movable along the slot with the movement of needle 15, the coil spring 17 being disposed on the top of the needle 15 in the hole 12 of the holder 11 with its upper end retained by the plug 18 which is mounted on the upper end of the holder 11 by means of screw thread engagement and urging the needle 15 downwardly. The needle 15, being urged by the spring 17, is resiliently slidable along the axis in the hole 12 and is stopped by the lever 16 abutting on the lower end of the slot 13.

The holder 11 is so formed that it can be mounted onto the spindle of a manufacturing machine such as a drill press and the like, by suitable means such as a chuck or adapter, in such a manner that the center axis of the centering pointer 10 coincides with that of the spindle of the manufacturing machine.

The centering block 20, as shown in FIGS. 3 and 4, is made of a cylindrical piece 21 with finely finished cylindrical surface thereon, and is formed with a L shaped cutaway 22 comprising two flat surfaces 24 and 25 spreading longitudinally along the axis thereof, the surface 24 passing through and beyond the center axis and crossing with the surface 25 at an angle of 90 degrees, said surface 24 having a magnet piece 23 embedded therein with its outer surface flush with surface 24.

As has been hereinbefore disclosed the centering device of this invention requires a dial indicator of conventional type when in use.

It is to be understood that the primary purpose and application of the centering device of this invention is to locate and align the center position of a hole and the like to be drilled or cut in a workpiece with the center axis of the spindle of a manufacturing machine such as a drill press. Normally the center position of a hole on a workpiece is given in the blue print with reference to such reference lines as the center line or a given, finished edge or end surface of the workpiece. Therefore it is to be noted that the workpiece to which the centering device of this invention is applied are of such nature that their end surfaces are already finished. However, as will be apparent from the later part of this description the centering device of this invention is also applicable to the workpiece having unfinished end surfaces.

The normal application of the centering device of this invention will now be described, in connection with the examples illustrated in FIGS. 5A, 5B and 6, as follows.

Referring to FIGS. 5A and 5B, a cylindrical workpiece 30 with finished ends, as an example, is prepared for drilling a hole through the center axis perpendicular to the axis of the workpiece 28 mm from one end.

To proceed with the drilling process, first clamp the work piece 30 on a work table equipped with devices for longitudinal (X axis) and traversal (Y axis) feeding, with suitable clamping means such as vise 40 leaving the ends of the workpiece open. Then align the axis of the workpiece parallel to the X axis of the work table, and fix it securely.

Then mount the centering pointer 10 of this invention as shown in FIGS. 1 and 2 onto the spindle of the drill press with the lower point of the needle 15 pointing downward; meantime set a dial indicator with its stand firmly placed on a stationary part of the drill press, with the arm holding the dial indicator extending in such manner that the lower point of the dial indicator is in contact with the upper face of the lever 16, and then align the 0 mark or the origin of the scale of the dial with its hand.

Then manipulate the feeding devices to move the workpiece toward the lower point of the centering pointer 10, also raise the work table till the upper side portion of the work piece comes in contact with the the low point of the centering pointer 10; the contact can be determined from the movement of the hand of the dial indicator. Then move the work table back and forth gently along the Y axis and watch the fluctuation of the hand of the dial indicator. When the work table is moved, the lower point of the center pointer slides along the convex path of the surface of the workpiece while keeping in contact with the surface thereof by the resilient force of the spring 17, and ascending or descending accordingly. The ascending or descending movements of the needle 15 are transmitted to and shown by the hand of dial indicator 50. When the needle 15 ascends, the hand of dial 50 moves in one direction (normally marked + on the dial), and when the needle 15 descends, the hand of dial 50 moves in the opposite direction (normally marked −). Watch the movement of the hand on the dial when the work table is moved continuously in one direction to let the lower point of the needle 15 slide over the peak of the convex path over the cylindrical surface of the workpiece 30, and note the position where the hand on the dial stops moving in one direction and is pending to move in the opposite direction as the lower point of the needle 15 arrives at the peak of the path. Repeat the same process two to three times to ensure the consistency of the movement each time and stop the work table at the point where the lower point of the needle 15 is at the peak or the highest point of the cylindrical surface of the workpiece 30. At this point the center axis of the needle is aligned with the vertical center axis of the workpiece 30, or the vertical center axis of the work piece 30 is aligned with that of the spindle of the drill press. Then lock the feeding device along the Y axis to prevent the movement of the work table along the Y axis.

The center of the work piece with respect to the Y axis is thereby located and aligned.

The next step is to locate and align the position 28 mm from one end of the work piece with the center axis of the spindle. This is performed as follows.

First lower the worktable to clear the workpiece 30 from the needle 15. Attach a precision angle plate 70 to the work table with its vertical surface 71 in abutment with the end surface of the workpiece 30, and fix it firmly on the work table. Mount the centering block 20 onto the upper, inner edge of the angle plate 70 with the surface 24 abutting on the vertical surface 71, as shown in FIG. 5B. Since there is a magnet embedded in the surface 24 of the centering block 20, the centering block 20 will stick to the angle plate 70 which is normally made of iron. Then move the work table along the X axis and raise the work table till the upper edge of the centering block 20 comes into contact with the lower point of the needle 15. Repeat the same process as described above to align the vertical center axis of the centering block 20 with the center axis of the needle 15. Since the surface 24 abutting on the end surface of the workpiece 30 passes through the center axis of the centering block 20, and the vertical center axis of the centering block 20 is now aligned with the center axis of the needle 15 which coincides with the center axis of the spindle, the end surface of the work piece is now aligned with the center axis of the spindle.

Then take the reading on the scale and note the position of the work table along the X axis. Move the work table outwardly 28 mm from that position along the X axis; the center position of the hole as given in the blue print is thus located and aligned with the center axis of the spindle. Lock the feeding device along the X axis to prevent the movement of the work table along the X axis, dismantle the centering pointer 10 from the spindle and mount the drill of specified size. The drilling operation can now proceed.

Although an application of the centering device of this invention to hole drilling is illustrated, the device of this invention is equally applicable to such work as slot or key way cutting by a milling machine.

Figure 6:
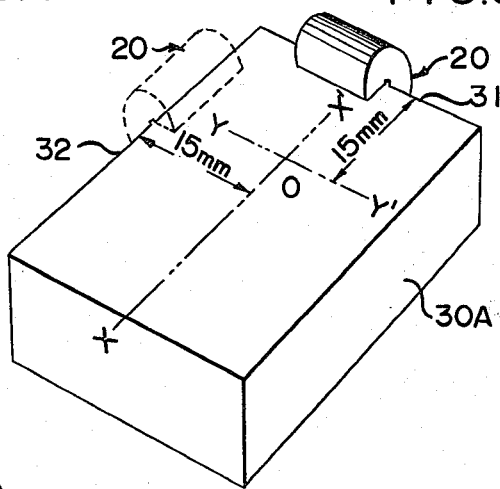
FIG. 6 is a perspective view of a work piece with centering block in another application of the centering device of this invention.

Referring to FIG. 6, there is a rectangular workpiece 30B prepared for drilling a hole through its center axis 15 mm from two finished side surfaces 31, 32 which are perpendicular to each other. In this case the procedure is as follows:

First, clamp the workpiece 30A with a suitable clamping means such as a vise on a work table having feeding devices along the X and Y axes with the two finished side surfaces 31, 32 perpendicular to the surface of the work table, and parallel to the X and Y axes respectively.

Second, mount the centering pointer 10 onto the spindle of the drill press and set the dial indicator as described previously.

Third, mount the centering block 20 onto the edge of one of the two finished side surfaces (31, for example) with the surface 24 of the L shaped cutaway abutting the side surface. In case the workpiece is of a non magnetic material such as brass, a suitable means such as a pressure sensitive adhesive or a tool maker's clamp can be used to hold the centering block securely onto the workpiece 30A.

Fourth, manipulate the feeding devices and align the side surface 31 with the center axis of the spindle following the same process as described previously.

Fifth, take the reading of the position of the work table on the scale along the X axis, and then move the work table outward 15 mm from that position along the X axis. Then lock the feeding device along the X axis to prevent the movement of the work table along the X axis.

Sixth, remove the centering block from the side surface 31 and mount it onto the other side surface 32. Repeat the preceeding Fourth and Fifth procedures except that the movement of the worktable is now along the Y axis instead of X axis.

Finally, dismantle the centering pointer 10 from the spindle and mount the drill of specified size. The drilling operation can now proceed.

Figure 7:
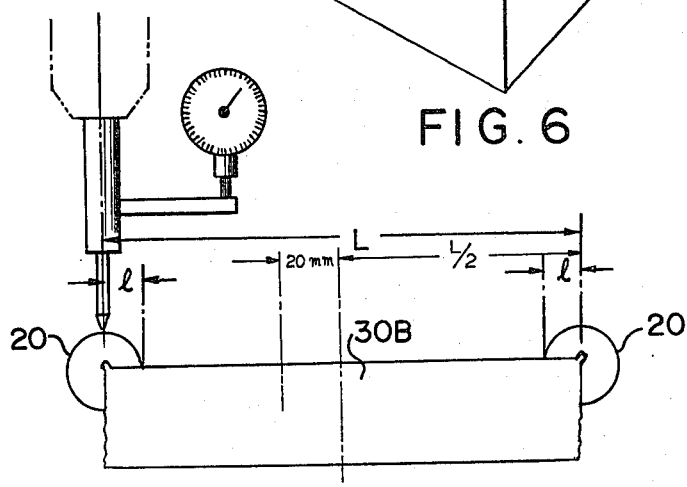
FIG. 7 is a front view of a work piece with centering blocks in still another application of the centering device of this invention.

In case the side surfaces are not finished and the center position of the hole to be drilled is given with respect to the center line of the work piece, the process of locating and aligning the center axis of the hole to be drilled with the center axis of the spindle of the drill press is as follows:

Referring to FIG. 7, a rectangular work piece 30B having unfinished side surfaces is prepared for drilling a hole through its center axis 20 mm from the center lines of the work piece along the X and Y axes respectively. In this case the procedure is similar to that in the preceeding case except that the use of two centering blocks is more convenient than one at a time, and an additional procedure for locating the center line of the workpiece as follows is needed.

Mount the two centering blocks, each on the edge of one of the two opposite side surfaces along the X axis. Test and align the axis of the centering blocks to be parallel with the Y axis and the surface of the work table. Locate the vertical center axis of each centering block by following the same process as above described and then note the position on the scale along the X axis respectively and calculate the distance L between the two. Divide L by 2 and move the work table L/2 from one of the two positions noted on the scale. At this point the center of the workpiece is located and aligned with the center axis of the spindle. By further moving the work table to move the workpiece 20 mm in the desired direction along the X axis, the center position of the hole to be drilled along the X axis is located and aligned with the center axis of the spindle.

The center position of the hole to be drilled along the Y axis can be located and aligned with the center axis of the spindle in the same manner described above.

The workpiece 30A, if so desired, can be marked with a reference line at the edge of the centering block which is 22 1 mm from the vertical center axis of the centering block as shown in FIG. 7.

As is apparent from the foregoing description of the applications of the centering device of this invention the centering device of this invention eliminates the conventional need for a marking process and extra handling, and in the meantime provides a method that is more effective and accurate for the center locating and aligning process with less cost. The spirit and scope of this invention are defined by the following claims.

I claim:

1. A centering device comprising:
   a centering pointer comprising a cylindrical hollow holder having two ends and within which a needle member having a lower point is slidably coaxially held, and extends out of the first end of said holder, said needle member being resiliently urged by a spring means to extend out of said holder, said spring being disposed within the space defined by the hollow holder, a plug located at the other end of said holder and the needle member, a lever mounted onto said needle member and extending outwardly through a slot formed on said hollow holder, a measuring device for sensing the displacement of said lever, said hollow holder adapted to be coaxially detachably mounted onto the spindle of a manufacturing machine; and
   a truncated cylindrical centering block provided with a cylindrical surface having a center axis, and a L-shaped cutaway having two planar surfaces forming a 90 degree angle therebetween, at least one of said surfaces passing through said center axis; said centering block adapted to be mounted on a workpiece with said one surface abutting a side edge of the workpiece to be aligned with the center axis of said centering pointer, said alignment being attained by causing said needle member of said centering pointer to move axially by moving said centering block with the workpiece in a direction perpendicular to the center axis of said centering pointer so that said lower point of said needle member contacts and moves along said cylindrical surface with the upward movement of said needle member causing said lever to actuate the measuring device which thereby indicates that alignment has been attained.

2. A centering device as recited in claim 1, wherein said centering block is provided with a magnet piece embedded in the surfaces forming said L-shaped cutaway.

* * * * *

UNITED STATES PATENT AND TRADEMARK OFFICE
CERTIFICATE OF CORRECTION

PATENT NO. : 4,319,400
DATED : March 16, 1982
INVENTOR(S) : Hun-Hwei Chung

It is certified that error appears in the above—identified patent and that said Letters Patent is hereby corrected as shown below:

Column 6, line 8 "22 1 mm" should read -- 21 mm --.

Signed and Sealed this

First Day of June 1982

[SEAL]

Attest:

GERALD J. MOSSINGHOFF

*Attesting Officer*     *Commissioner of Patents and Trademarks*